Sept. 21, 1926.
R. T. STEVENS
LEVEL
Filed Oct. 20, 1925
1,600,855
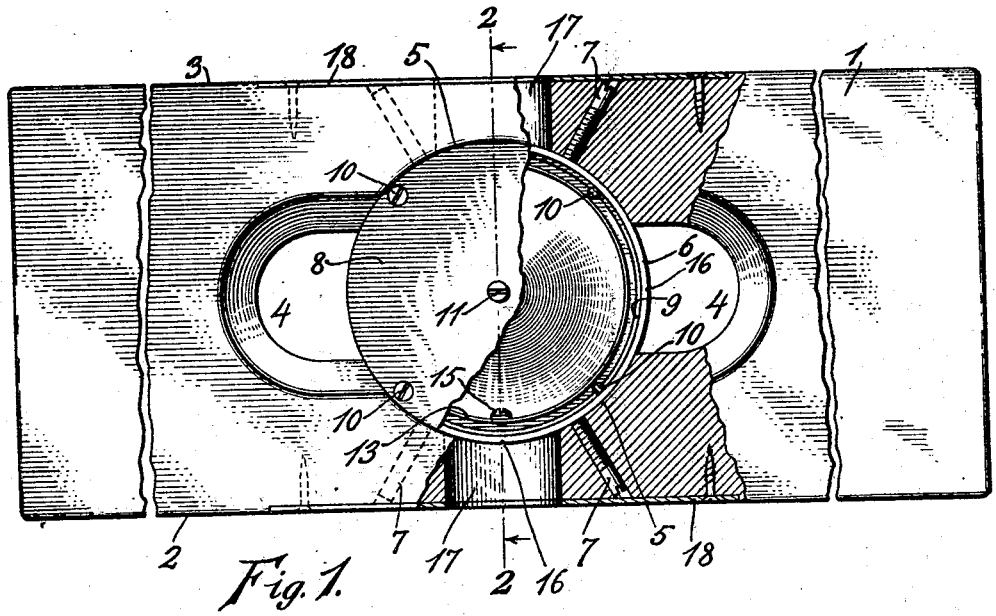
Fig. 1.
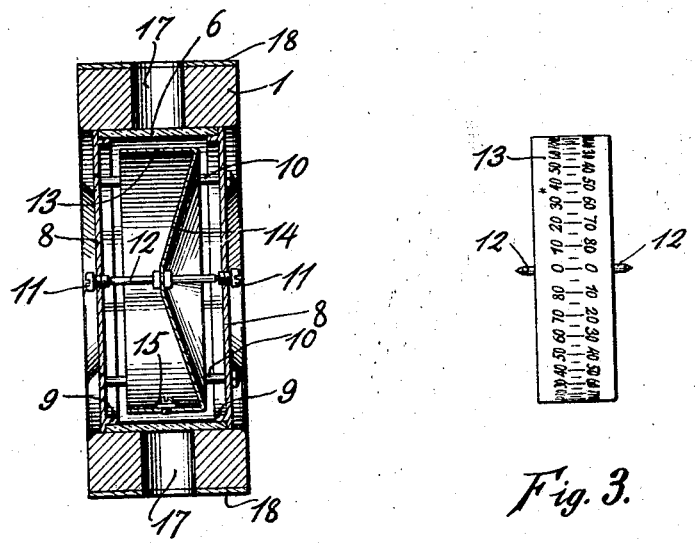
Fig. 2.
Fig. 3.
Inventor
Roy T. Stevens.
By
Attorney Patented Sept. 21, 1926.

1,600,855

UNITED STATES PATENT OFFICE.

ROY T. STEVENS, OF McCOOK, NEBRASKA.

LEVEL.

Application filed October 20, 1925. Serial No. 63,653.

This invention relates to improvements in levels of the type in which the degree of inclination is determined by means of a pendulum instead of by the usual arcuate tube containing spirits.

It is often desirable to be able to determine the degree of inclination of a surface as well as to determine whether or not the surface is level. With the ordinary spirit level no means are, as a rule, provided for anything but for determining when a surface is level.

It is the object of this invention to produce a level by means of which any degree of inclination between a level or horizontal surface and a vertical, or plumb surface, may be correctly measured. This is of great importance in building construction as it is often desirable to compare the inclination of different surfaces, as, for example, in building porch posts having an upward taper, comparing the inclinations of different sides of a roof, etc.

I attain the above objects by means of a construction and arrangement of parts which I will now describe in detail, reference for this purpose being had to the accompanying drawing in which the preferred embodiment of my invention is shown and in which:

Fig. 1 is a side elevation of my improved level, parts thereof being broken away so as to more clearly disclose the construction;

Fig. 2 is a section taken on line 2—2, Fig. 1, and

Fig. 3 is a side elevation of the pendulum showing the scale which is applied to the outer surface thereof.

My level comprises a rectangular body member 1 of wood or metal. This member may have a rectangular cross section and has the two opposite edges 2 and 3 as nearly parallel as possible. At a point substantially centrally of the body member 1, I provide an elongated opening 4. The sides of this opening have opposite arcuate portions 5 which are concentric and have the same radius. My inclinometer mechanism, which will now be described, is secured in place between the arcuate sides 5 by means which will be hereinafter described. The inclinometer mechanism comprises a cylindrical section 6 of glass or other transparent material whose outside diameter equals the diametrical distance between the arcuate surfaces 5 and is removably clamped in place by means of screws 7. The ends of the cylindrical member 6 are closed by circular disks 8 having annular flanges 9 that fit against the inner surface of the transparent cylinder 6. The disks 8 are held against the cylinder ends by means of a plurality of bolts 10. The disks 8 are each provided at their centers with screws 11 which are threadedly secured to the disks so that they may be adjusted for a purpose that will hereinafter presently appear. The inner ends of the screws 11 have conical openings for the reception of the conical ends of the shaft 12 which are journaled in said openings. Secured to the shaft 12 is a dish-shaped pendulum having a cylindrical flange or wall 13 and an inwardly projecting conical bottom 14. The pendulum is preferably pressed from some light sheet metal, such as, aluminum and has a weight 15 secured to one side. This weight must be of sufficient value to hold the pendulum against rotation and to maintain it in such a position that a vertical line passing through the center of gravity of the weight will also intersect the axis of the shaft 12. The outer surface of the cylindrical wall 13 of the pendulum is graduated and divided into seventy-two equal spaces, each of which represents five degrees. These graduations are divided into four equal sections or quadrants, each comprising ninety degrees and each section is numbered in opposite directions from 0 to 90. The ring 6 has two sets of marks 16 spaced 90 degrees apart, one set of which is located on the axis of member 1 and the other in a plane perpendicular to member 1 (see Fig. 1). Openings 17 permit the upper and lower mark 16 to be seen. The position of the pendulum may also be determined by inspection through openings 4. By means of the screws 11 the friction of the bearings may be adjusted so as to make it the least possible, and so as to obtain a free movement of the pendulum. When great accuracy is required jeweled bearings, like those used in watches, may be employed. Plates 18 are embedded in the sides of the member 1 in the manner shown.

I desire to call particular attention to the construction of the inclinometer device which is so made that it forms an independent assembly which can be fully assembled and adjusted before it is put into place. The transparent cylindrical ring 6, together with the flanged disks 8 form a housing for the pendulum. The conical bottom 14 of the pendulum makes the latter rigid and makes it possible to use very thin light metal in its construction. The adjustable cone bearings comprising the screws 11 make it possible to obtain a very delicate adjustment.

From the above it will be apparent that I have produced a level of very simple construction that can be used for many purposes for which a spirit level of ordinary construction is unsuited and which is adapted for the most accurate work.

Having now described my invention, what I claim as new is:

An inclinometer device comprising, in combination, a cylindrical member of transparent material, end closures for said member, said closures consisting of circular disks having an annular flange extending from one side, said flange being adapted to project into said cylindrical member and to serve as positioning means, means connecting said end closures so as to hold the latter against the ends of the cylindrical member, adjustable bearing members secured to the end closures at the center point of each closure, a shaft rotatably mounted in said bearings, and a dish-shaped pendulum secured to said shaft, said pendulum having its outer surface graduated.

In testimony whereof I affix my signature.

ROY T. STEVENS.